United States Patent [19]
Matusyak

[11] Patent Number: 6,053,204
[45] Date of Patent: Apr. 25, 2000

[54] REGULATION DISC VALVE WITH DISCHARGING DEVICE

[76] Inventor: Vladimir Leonidovich Matusyak, 21 Microregion of Begmy, Apt. 108, Kuznetsovsk, Rovno District, 265921, Ukraine

[21] Appl. No.: 08/981,162

[22] PCT Filed: Jun. 26, 1995

[86] PCT No.: PCT/RU95/00104

§ 371 Date: Aug. 18, 1998

§ 102(e) Date: Aug. 18, 1998

[87] PCT Pub. No.: WO96/31719

PCT Pub. Date: Oct. 10, 1996

[30] Foreign Application Priority Data

Apr. 5, 1995 [RU] Russian Federation ............. 95104949

[51] Int. Cl.[7] .................................................. F16K 39/04
[52] U.S. Cl. ...................................... 137/625.31; 251/283
[58] Field of Search ......................... 137/625.31; 251/283

[56] References Cited

U.S. PATENT DOCUMENTS 4,186,773  2/1980  Flynn .............................. 137/625.31 X
5,063,954  11/1991  Hendrick ............................. 137/625.31

*Primary Examiner*—John Fox
*Attorney, Agent, or Firm*—Jack Lo

[57] ABSTRACT

A regulation disc valve with discharging device comprises a body (1) containing an easily removable fixed seat (2) with peripheral ports (3) and a central channel (13); a rotary disc slide (4) with notches and a central longitudinal aperture constantly engaging seat (2); a spindle (5); and a lid comprising a cylinder (8). A piston (7) permanently connected to slide (4) cooperates with cylinder (8) to form a discharge chamber (9), which is in turn connected to a drainage cavity (11). On the sealing surface of slide (4) is an intermediate chamber (12) formed by sectorial notches that interact with central channel (13) of seat (2) (FIG. 1, FIG. 2). The valve provides optimal pressure of slide (4) against seat (2) under various surface areas of the passage ports (3) without modifying the dimensions of the discharging device for that type of valve. At the same time, the valve eliminates the possibility of slide (4) disengaging from seat (2) under any degree of valve opening without changing the pressure in discharge chamber (9). The valve also provides constant specific pressure at the sealing, surfaces. There is no limitation of the disc valve flow capacity if a high differential pressure is applied to the valve.

3 Claims, 2 Drawing Sheets

1

REGULATION DISC VALVE WITH DISCHARGING DEVICE

CROSS REFERENCE TO RELATED APPLICATIONS

This is a U.S. national stage application of international application number PCT/RU95/00104, having an international filing date of Jun. 26, 1995.

BACKGROUND OF THE INVENTION

1. Field Of The Invention

This invention relates generally to valves, specifically throttle disc valves for maintaining required parameters in industrial processes, e.g., in heat power engineering at power plants for regulating feedwater discharge in a steam generator.

2. Prior Art

A prior art regulation disc valve with an external discharging device (SU 731163, 1978) works with a pressure differential of up to 20 MPa. The valve design is too complicated for production and servicing, which makes it less reliable. It also has limited flow capacity.

Another regulation disc valve with an internal discharging device (SU 987257, 1983) comprises a body containing a fixed seat with peripheral ports and a central channel. The fixed seat is in constant contact against a slide, which has notches. The slide is connected to a spindle and cylinder, and communicates with an intake chamber and a drainage chamber. A piston positioned in the cylinder cooperates with the cylinder to form a discharge chamber. The shortcomings include complicated design, insufficient reliability, and limited flow capacity.

A considerable shortcoming of these and other discharging type disc valves is the poor relationship between the slide-to-seat clamping force and off-loading force during valve opening and when the port area changes. This may result in the slide breaking away from the seat, an uncontrolled increase of the working medium flow rate, vibration, and premature failure.

OBJECTS OF THE INVENTION

The objects of the present regulation disc valve with discharging device are improved reliability, and overcoming the limited flow capacity when high differential pressure is applied to the valve.

BRIEF SUMMARY OF THE INVENTION

These objects are achieved with a regulation disc valve with a dedicated discharging device which provides an optimal relationship between the slide-to-seat clamping force and off-loading force at any port area in the area range of $0 < F_{pr} \leq F_{max}$ (where $F_{pr}$=port area, and $F_{max}$= maximum port area for that standard size valve) and any pressure change in the intake and drainage chambers.

The present regulation disc valve with discharging device comprises a body containing an easily removable fixed seat with peripheral ports and a central channel; a rotary disc slide with notches and a central longitudinal aperture constantly engaging the seat; a spindle; and a lid comprising a cylinder. A piston permanently connected to the slide cooperate with the cylinder to form a discharge chamber, which is in turn connected to a drainage cavity. On the sealing surface of the slide is an intermediate chamber formed by sectorial notches that interact with the central channel of the seat.

The present invention provides the following advantages:

If necessary the constructive area of the ports may be readily changed on the field where the valve is installed.

The spindle is protected from exposure to the working medium because it is located in the discharge chamber.

Specific constant pressure on the seat and slide sealing surfaces is maintained at a relatively constant level.

Conditions of slide vibration occurrence in the working medium flow are excluded.

Slide seizures are prevented when hard particles are present in the working medium.

A removable protective or throttle shell may be installed under the seat.

When a pressure drop is applied to the valve the impact on the seat force decreases proportionally to the degree of valve opening.

DETAILED DESCRIPTION OF THE INVENTION

Figure 1:
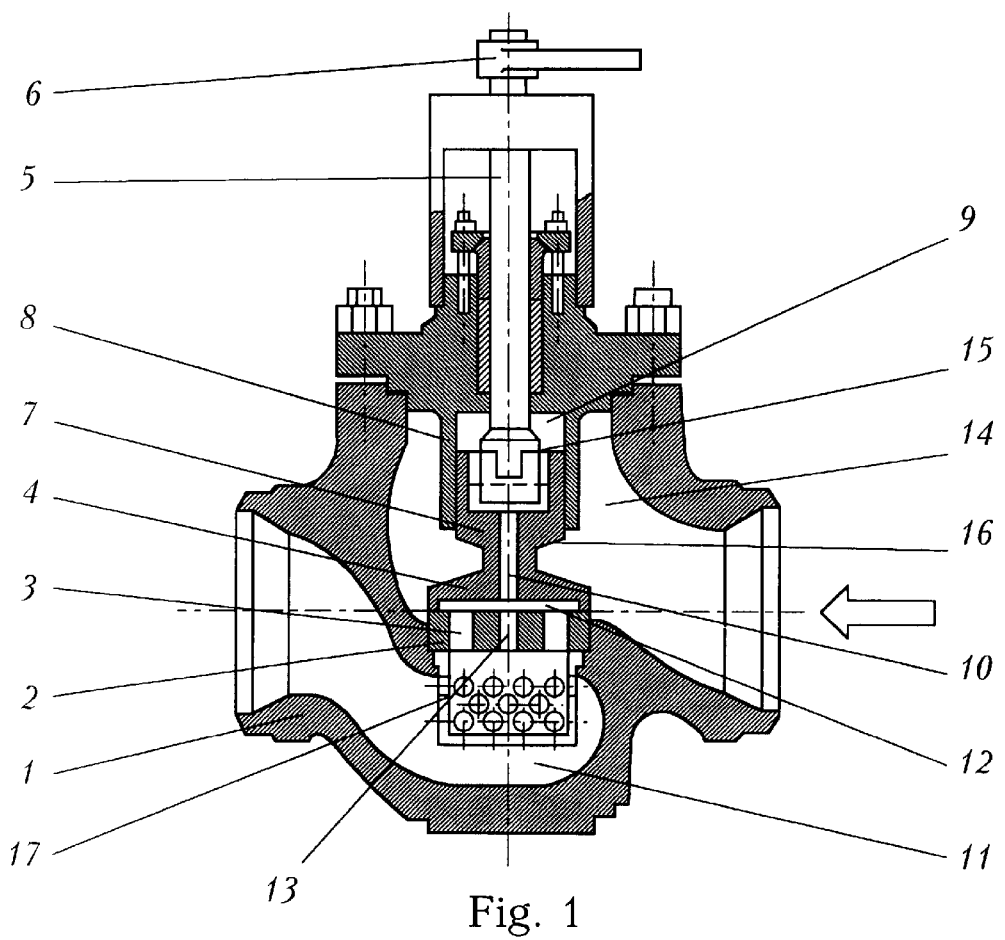
FIG. 1 is a sectional view of a regulation disc valve with discharging device.

Valve body 1 contains a seat 2 with peripheral passage ports 3 and a rotary disc slide 4 with notches. Ports 3 are for passing a regulated working medium. A spindle 5 and a lever 6 transmit torque from an actuator (not shown) to slide 4. A piston 7, which is fixedly connected to slide 4, and cylinder 8 form a discharge chamber 9. Discharge chamber 9 is connected with a drainage cavity 11 by a channel 10 and an intermediate chamber 12. Intermediate chamber 12 is formed as sectorial notches on the seating surface of slide 4, and communicates with a central channel 13 of seat 2. A working medium enters an intake chamber 14 of the valve. Piston 7 has active surfaces 15 and 16; the areas of these surfaces are chosen with the consideration that the discharge force should not exceed the clamping force of slide 4 against seat 2. A protective shell 17 is installed in drainage cavity 11 under seat 2.

The valve operates as follows:

Regulation of the working medium flow rate is provided by rotating slide 4, which changes the area of flow section of the overlapped openings 3 in seat 2.

Figure 2:
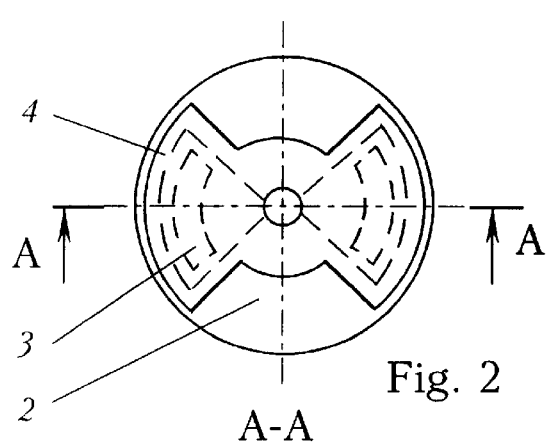
FIG. 2 is an enlarged view of a slide with a seat in a closed position.
Figure 3:
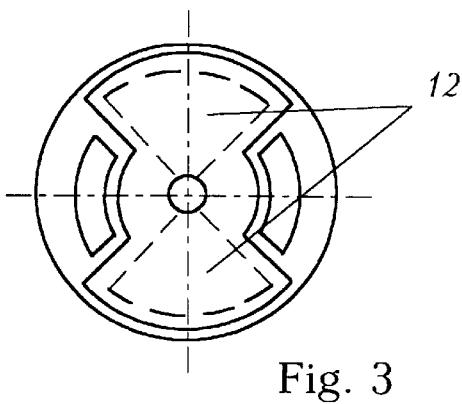
FIG. 3 is an enlarged view of the slide with the seat in an opened position.

The discharging device operates as follows:

When regulating the working medium flow rate, slide 4 rotates, and in doing so the areas of openings 3 (FIG. 2) overlapped by slide 4 is compensated by the area of intermediate chamber 12 (FIG. 3), the pressure in which is always equal to the pressure in drainage cavity 11 (FIG. 1).

Figure 4:
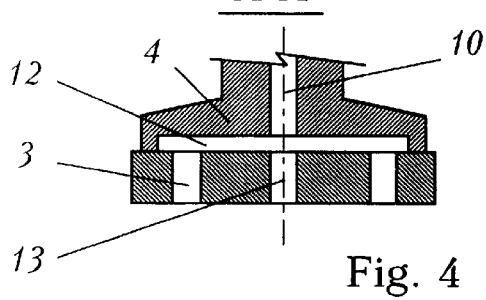
FIG. 4 is a sectional view of seat along line A—A.
Figure 5:
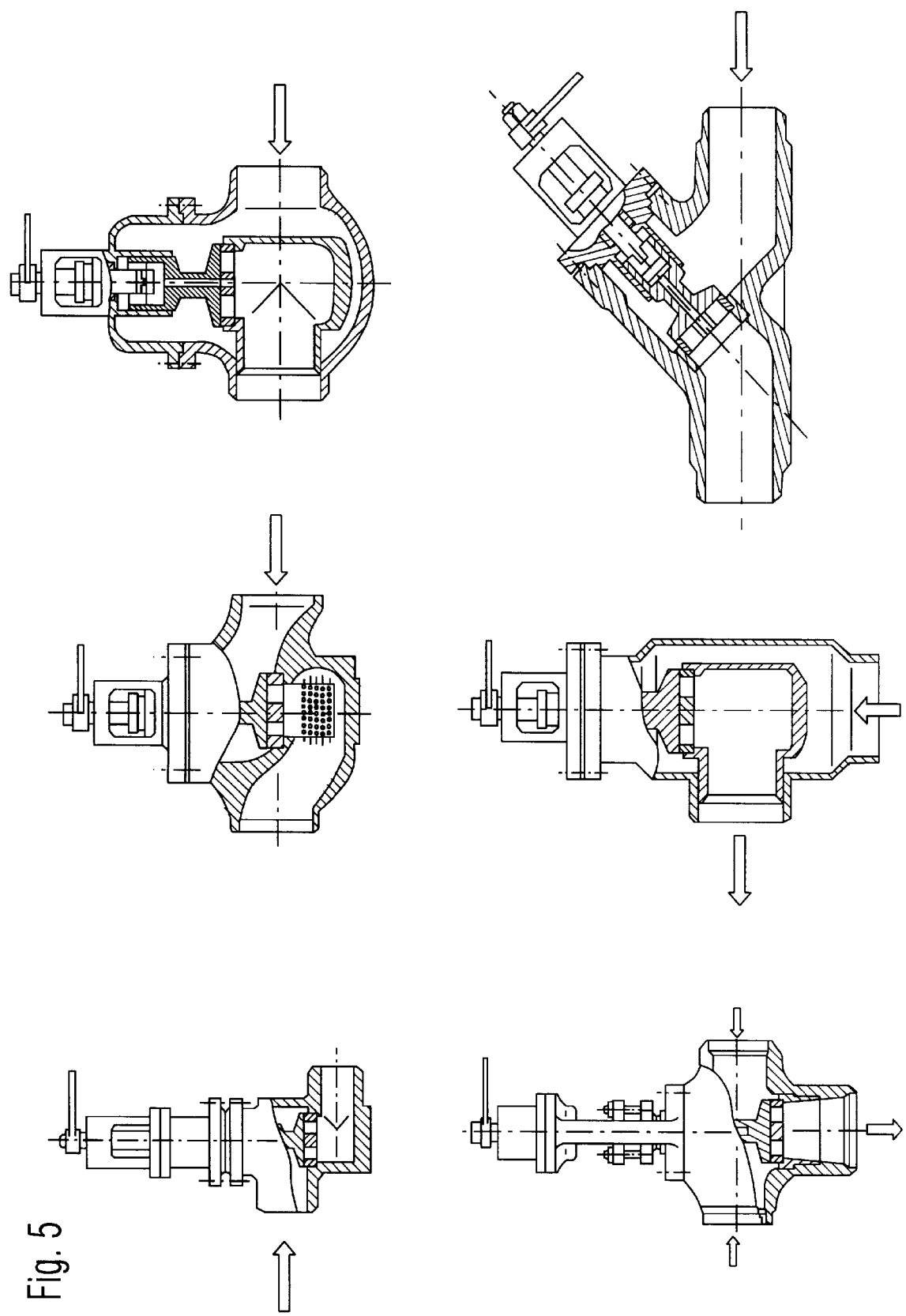
FIG. 5 shows alternative bodies of the regulation disc valve.

The clamping force of slide 4 (FIG. 4) on seat 2 is equal to the intermediate chamber 12 area (FIG. 3) multiplied by the pressure difference between intake chamber 14 and drainage cavity 11. The clamping force remains in the optimal relationship with the discharge force. The discharge force is directly proportional to the areas of the active surfaces 15 and 16 of piston 7, and the pressure difference between intake chamber 14 and drainage cavity 11 of the valve.

As a result optimal clamping force of slide 4 on seat 2 is maintained even when the valve is fully opened, and at any partial openings.

INDUSTRIAL APPLICATION

The regulation disc valve with discharging device can be used as the regulation element of the actuators in the automatic regulation systems at fossil and nuclear power plants.

The valve can provide reliable operation of the main equipment in conditions of high pressure and temperatures at small and high working medium flow rates.

The valve can work with water, steam, and double-phase steam-water medium. As a feedwater regulating valve, it can provide regulation of water discharging into a steam generator, beginning at unit startup, with the maximum pressure drop on the valve, until full power is reached.

The body of the valve may be of an arc or passage type.

I claim:

1. A regulation disc valve with discharging device, comprising:

a body;

an intake chamber positioned in said body;

a drainage cavity positioned in said body;

a fixed seat positioned between said intake chamber and said drainage cavity, said fixed seat having a plurality of passage ports and a central channel providing communication between said intake chamber and said drainage cavity; and a rotary disc slide positioned against said fixed seat, said rotary disc slide having a plurality of notches on a sealing surface abutting said fixed seat, said notches cooperating with said fixed seat to form an intermediate chamber, said rotary disc slide covering said passage ports when in a closed position, said rotary disc slide fully uncovering said passage ports when in an opened position, said rotary disc slide partially uncovering said passage ports when in an intermediate position said intermediate chamber completely overlapping said passage ports when said rotary disc slide is in said closed position, and partially overlapping said passage ports when said rotary disc slide is in said intermediate position.

2. A regulation disc valve with discharging device, comprising:

a body;

an intake chamber positioned in said body;

a drainage cavity positioned in said body;

a fixed seat positioned between said intake chamber and said drainage cavity, said fixed seat having a plurality of passage ports and a central channel providing communication between said intake chamber and said drainage cavity;

a rotary disc slide positioned against said fixed seat, said rotary disc slide having a plurality of notches on a sealing surface abutting said fixed seat, said notches cooperating with said fixed seat to form an intermediate chamber, said rotary disc slide covering said passage ports when in a closed position, said rotary disc slide fully uncovering said passage ports when in an opened position, said rotary disc slide partially uncovering said passage ports when in an intermediate position, said intermediate chamber completely overlapping said passage ports when said rotary disc slide is in said closed position, and partially overlapping said passage ports when said rotary disc slide is in said intermediate position;

a cylinder attached within said housing;

a piston positioned within said cylinder and attached coaxially to said rotary disc slide; and a spindle extending through said housing, an inner end of said spindle connected to said piston, said spindle rotating said piston when torque is applied to said spindle.

3. A regulation disc valve with discharging device, comprising:

a body;

an intake chamber positioned in said body;

a drainage cavity positioned in said body;

a fixed seat positioned between said intake chamber and said drainage cavity, said fixed seat having a plurality of passage ports and a central channel providing communication between said intake chamber and said drainage cavity;

a rotary disc slide positioned against said fixed seat, said rotary disc slide having a plurality of notches on a sealing surface abutting said fixed seat, said notches cooperating with said fixed seat to form an intermediate chamber, said rotary disc slide covering said passage ports when in a closed position, said rotary disc slide fully uncovering said passage ports when in an opened position, said rotary disc slide partially uncovering said passage ports when in an intermediate position, said intermediate chamber completely overlapping said passage ports when said rotary disc slide is in said closed position, and partially overlapping said passage ports when said rotary disc slide is in said intermediate position;

a cylinder attached within said housing;

a piston positioned within said cylinder forming a discharge chamber, said piston attached coaxially to said rotary disc slide, said piston including a channel providing communication between said intermediate chamber and said discharge chamber; and a spindle extending through said housing, an inner end of said spindle connected to said piston, said spindle rotating said piston when torque is applied to said spindle.

* * * * *